A. PLOFCHAN & J. ZURAW.
CAMERA SUPPORT.
APPLICATION FILED JUNE 24, 1916.
1,211,347.
Patented Jan. 2, 1917.
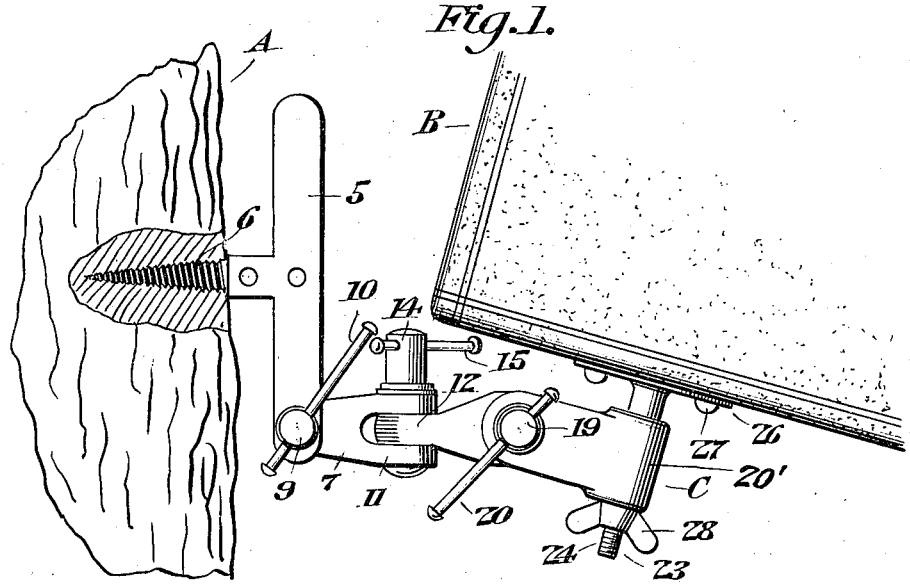
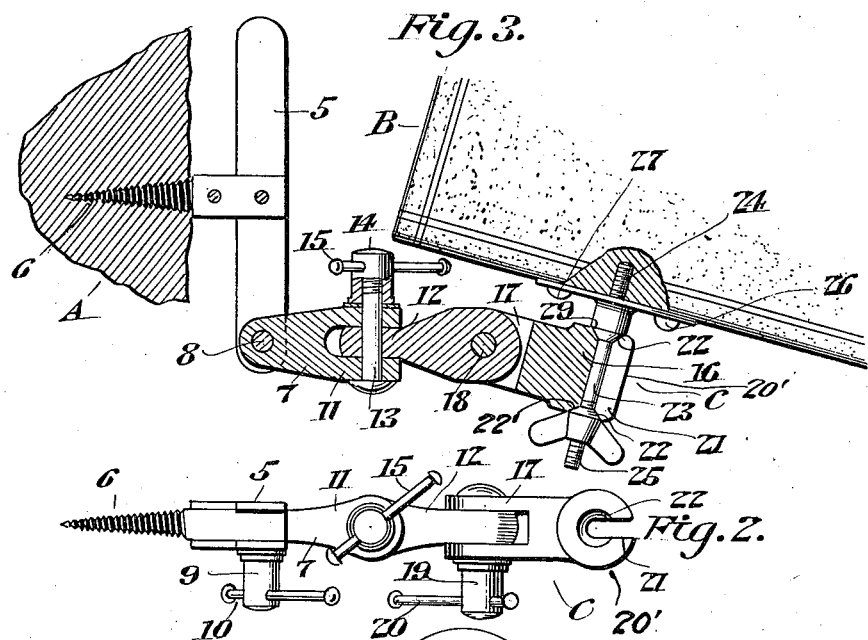
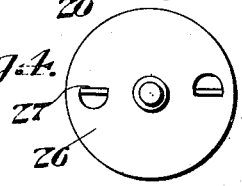
Inventors
Andrew Plofchan &
John Zuraw
By Victor J. Evans
Attorney
Witnesses

UNITED STATES PATENT OFFICE.

ANDREW PLOFCHAN AND JOHN ZURAW, OF DETROIT, MICHIGAN.

CAMERA-SUPPORT.

1,211,347. Specification of Letters Patent. Patented Jan. 2, 1917.

Application filed June 24, 1916. Serial No. 105,596.

*To all whom it may concern:*

Be it known that we, ANDREW PLOFCHAN and JOHN ZURAW, citizens of the United States, residing at Detroit, in the county of Wayne and State of Michigan, have invented new and useful Improvements in Camera-Supports, of which the following is a specification.

The invention relates to a bracket, and more particularly to the class of camera supports.

The primary object of the invention is the provision of a support of this character wherein a camera will be held so that it can be positioned accurately and may be hung from a tree, post, log or any other stationary part.

Another object of the invention is the provision of a support of this character wherein the construction thereof is novel in form to permit the tilting of the camera body into any desirable position as the occasion may require and it can be locked in such position or held fast therein.

A further object of the invention is the provision of a support of this character which is extremely simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings: Figure 1 is a fragmentary elevation of a tree showing the support constructed in accordance with the invention mounted thereon and holding the camera; Fig. 2 is a top plan view of the support; Fig. 3 is a vertical longitudinal sectional view thereof with the camera connected thereto; Fig. 4 is a plan view of the base disk for the camera, looking toward the under side of the disk.

Similar reference characters designate corresponding parts throughout the several views of the drawing.

Referring to the drawings in detail, A designates a portion of a tree and B the camera, which is of the ordinary well known construction, while C designates generally the support, which will be hereinafter fully described in detail.

The support C comprises a pair of T-shaped members 5 which are arranged in spaced and parallel relation and have riveted therebetween medially of the same a tapered screw 6 which is adapted to be worked into a tree, post, log or other upright or support, and between these members 5 near one end is arranged a swinging ear 7 which is supported upon a binding bolt 8 passed transversely through the members and said ear and carries a cap nut 9 provided with a slidable cross handle 10 so that it can be manually turned for the clamping of the ear 7 to hold it in its adjusted position, the ear 7 being formed with a bifurcation 11 into which fits a second ear 12 adapted to swing at right angles to the ear 7 upon a binding bolt 13 carrying a cap nut 14 having a slidable cross handle 15 so that on tightening the nut 14 the ear 12 will be firmly clamped in the ear 7 and thereby holding said ear 12 in its adjusted position.

Swingingly mounted upon the ear 12 is an arm 16 formed with a bifurcation 17 in which is received the ear 12 which has passed therethrough a binding bolt 18, the same being also passed through the arm 16 and carries a cap nut 19 having a slidable handle 20 and upon the tightening of the nut 19 the arm 16 will be firmly held in its adjusted position relative to the ear 12. The arm 16 is formed with a rounded end 20' provided with a slot 21 which opens through opposite faces and one side of said end 20', the opposite faces being formed with countersinks 22 and 22', respectively through which opens the slot 21 and into this latter is adapted to be removably received a binding stem 23 having threaded ends 24 and 25 respectively, while next to the threaded end 24 is a rest disk 26 having struck therefrom at diametrically opposite points gripping lips 27 so that the threaded end 24 can be tapped into the camera body B for the fastening of the stem 23 thereto, while adjustable on the other end 25 is a winged nut 28 which is adapted to become seated within the countersink 22' in the end 20', while the shoulder 29 on the disk centrally thereof is adapted to be seated in the other countersink 22 when the nut 28 is worked home on the threaded end 25 of the stem 23, and in this manner the latter is fastened in the arm 16 and can be readily detached therefrom.

It will be apparent that the support can be adjusted to position the camera B at any desirable angle or positioned for the taking of a picture.

From the foregoing description, taken in connection with the accompanying drawing, the construction and operation of the herein described support will be readily apparent and therefore, a more extended explanation has been omitted.

Having thus described our invention, we claim:

1. A support for a camera comprising means for detachable engagement with a part, an ear swingingly connected to said means, a second ear swingingly connected to the first named ear and movable at right angles thereto, an arm swingingly connected to the last named ear and having a slot opening through one end and also countersunk in opposite faces thereof, a stem detachably engaged in the slot and adapted to engage with a camera body, and means for fastening the stem in the slot engageable in one countersink.

2. A support for a camera comprising means for detachable engagement with a part, an ear swingingly connected to said means, a second ear swingingly connected to the first named ear and movable at right angles thereto, an arm swingingly connected to the last named ear and having a slot opening through one end and also countersunk in opposite faces thereof, a stem detachably engaged in the slot and adapted to engage with a camera body, means for fastening the stem in the slot and engageable in one countersink, and a disk on the stem and having a portion engageable in the other countersink.

3. A support for a camera comprising means for detachable engagement with a part, an ear swingingly connected to said means, a second ear swingingly connected to the first named ear and movable at right angles thereto, an arm swingingly connected to the last named ear and having a slot opening through one end and also countersunk in opposite faces thereof, a stem detachably engaged in the slot and adapted to engage with a camera body, means for fastening the stem in the slot and engageable in one countersink, a disk on the stem and having a portion engageable in the other countersink, and finger gripping lips cut and struck from the disk.

In testimony whereof we affix our signatures.

ANDREW PLOFCHAN.
JOHN ZURAW.